United States Patent [19]

Wylam et al.

[11] Patent Number: 5,102,748
[45] Date of Patent: Apr. 7, 1992

[54] NON-LEADED SOLDERS

[75] Inventors: Thomas E. Wylam, Clemmons; Thomas K. Leonard; Roy O. Newman, both of Winston-Salem, all of N.C.

[73] Assignee: Taracorp, Inc., Atlanta, Ga.

[21] Appl. No.: 762,659

[22] Filed: Sep. 19, 1991

Related U.S. Application Data

[63] Continuation of Ser. No. 518,149, May 3, 1991, abandoned.

[51] Int. Cl.$^5$ .................. B32B 15/20; C22C 13/00; B23K 35/26
[52] U.S. Cl. ................................ 428/647; 420/560
[58] Field of Search ............... 420/560, 561; 428/647; 228/263.11, 263.18

[56] References Cited

U.S. PATENT DOCUMENTS

| | | | |
|---|---|---|---|
| 1,239,195 | 9/1917 | Lorentowicz | 420/520 |
| 2,059,019 | 10/1936 | Palm et al. | 420/561 |
| 2,124,589 | 7/1936 | Palm | 420/560 |
| 3,087,813 | 4/1963 | Ueno et al. | 420/560 |
| 3,146,097 | 8/1964 | Allen | 420/560 |
| 4,248,905 | 2/1981 | Harvey | 420/560 |
| 4,357,162 | 11/1982 | Guan | 420/560 |
| 4,358,884 | 11/1982 | Harvey et al. | 29/402.18 |
| 4,362,576 | 12/1982 | Harvey | 148/2 |
| 4,374,904 | 2/1983 | Harvey | 420/560 |
| 4,492,602 | 1/1985 | Lee et al. | 420/500 |
| 4,540,437 | 9/1985 | Patel | 75/252 |
| 4,634,044 | 1/1987 | Hargrove et al. | 228/183 |
| 4,643,875 | 2/1987 | Mizuhara | 420/560 |
| 4,670,217 | 6/1987 | Henson et al. | 420/562 |
| 4,695,428 | 9/1987 | Ballentine et al. | 420/560 |
| 4,758,407 | 7/1988 | Ballentine et al. | 420/560 |
| 4,778,733 | 10/1988 | Lubrano et al. | 420/560 |
| 4,806,309 | 2/1990 | Tulman | 420/562 |

FOREIGN PATENT DOCUMENTS

| | | | |
|---|---|---|---|
| 2054542 | 5/1972 | Fed. Rep. of Germany | 420/560 |
| 323223 | 12/1971 | U.S.S.R. | 420/561 |
| 474981 | 11/1937 | United Kingdom | 420/561 |
| 2158459A | 11/1975 | United Kingdom | 420/560 |
| 2146354A | 4/1985 | United Kingdom | 420/561 |

Primary Examiner—John Zimmerman
Attorney, Agent, or Firm—Kilpatrick & Cody

[57] ABSTRACT

Non-leased solders formed of tin, copper and selenium or tellurium. Such solders display lower melting points than other non-leaded solders, and their narrow pasty range allows them to set up easily in the field. Such solders also display superior tensile strength, shear strength and hardness properties, and are less expensive to produce than conventional non-leaded solders which contain tin/copper/silver formulations or formulations of four or more elements.

12 Claims, 1 Drawing Sheet

NON-LEADED SOLDERS

This is a continuation of copending application Ser. No. 07/518,149 filed on May 3, 1990 now abandoned.

This invention relates to non-leaded solders which include tin, copper and selenium or tellurium, processes for making such solders, and articles made from them.

BACKGROUND OF THE INVENTION

The conventional formulation for plumbing solder is 50% by weight of tin and lead. This formulation has a low melting point, wets well, forms a high strength bond with copper pipe, and is easy to apply. The use of lead in solders for potable water plumbing applications has recently become the subject of regulation and legislation in many countries, however, because of toxicological concerns. Several solder producers have responded by attempting to formulate a plumbing solder that melts at a low temperature, sets up quickly, is inexpensive and strong, and otherwise exhibits the excellent physical and mechanical properties of tin/lead solder.

The conventional approach to non-leaded plumbing solders is a tin/antimony composition in the range of approximately 95% tin and 5% antimony by weight ("95/5" solders). Although such solders exhibit adequate strength and hardness properties, they have not been well received by plumbers, mainly because of their extremely high melting point. They are also unsuitable for environments which encounter high cyclic stress and vibration, such as in refrigeration applications. Solders containing approximately 95% tin and 5% silver are frequently substituted in such applications where a non-leaded solder is required.

A number of solders reflect added silver and other metals to the tin/antimony alloy in an effort to lower the melting point, improve flowability and enhance the solder properties. Solders formed of tin, antimony, zinc and silver, for instance, are disclosed in U.S. Pat. No. 4,670,212 issued June 2, 1987. U.S. Pat. No. 4,758,407 issued July 19, 1988 and U.S. Pat. No. 4,695,428 issued Sept. 22, 1987 discuss adding copper to the tin/antimony/zinc/silver composition in order to lend extra body to the solder. Although zinc lowers the melting temperature, it can subject such solders to porosity defects and inconsistencies. U.S. Pat. No. 4,806,309 issued Feb. 21, 1989 discloses a solder containing tin, antimony, bismuth and silver to overcome this problem. The silver is said to compensate for the decreased shear and tensile strength imparted by the bismuth, which lowers the melting temperature of the solder.

A non-tin/antimony approach to non-leaded solders is the tin/copper/silver solder reflected in U.S. Pat. No. 4,778,733 issued Oct. 18, 1988. That patent discloses ternary solders that contain approximately 92-99% by weight of tin, 0.7-6% copper and 0.05-3% silver. The high melting point and broad range between solidus and liquidus phases, however, render such solders more troublesome to apply and slower to set up in use.

SUMMARY OF THE INVENTION

Solders of the present invention contain tin, copper, and selenium or tellurium. The inventors have found that the presence of selenium or tellurium increases flowability and extrudability of the solders, results in harder and stronger joints than tin/copper/silver solders, imparts a lower melting point, allows the solders to set up more quickly, and results in solders that are less expensive to formulate and produce. Such solders are also simpler, and thus less expensive to formulate and produce than the quaternary and quintenary solders mentioned above.

It is accordingly an object of the present invention to provide non-leaded solders which overcome the problems mentioned above, which exhibit excellent tensile and shear strength, melting point, flowability, wetting, extrudability, and hardness properties, and which are relatively inexpensive to produce. Other objects, features and advantages of the invention will become apparent with respect to the remainder of this document.

DETAILED DESCRIPTION OF THE DRAWINGS

Figure 1:
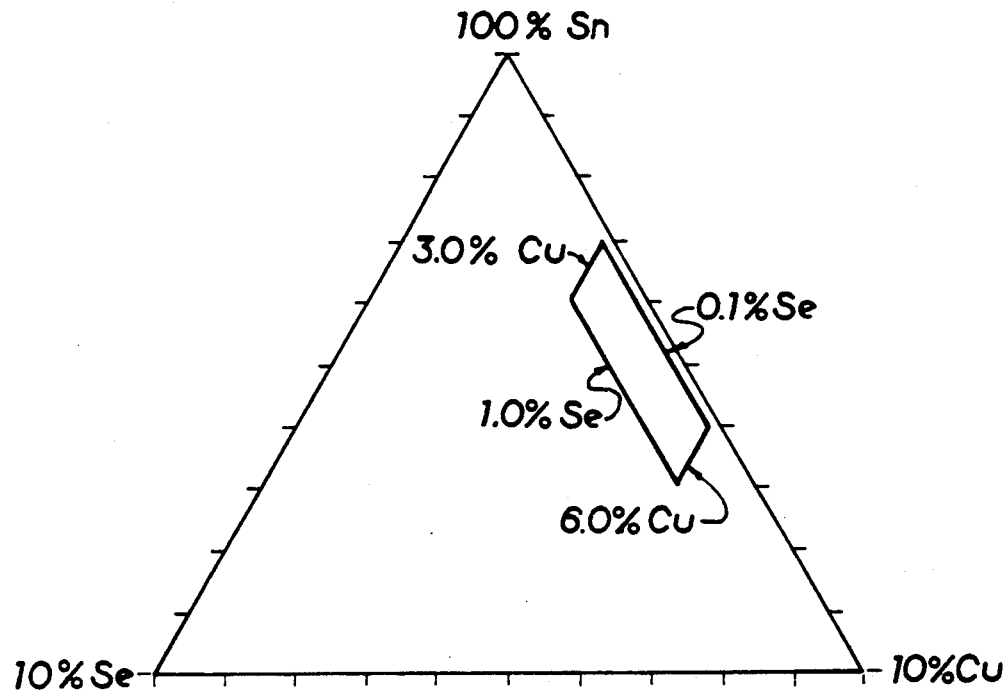
FIG. 1 shows the tin-rich portion of a ternary diagram and the locus of compositions of tin/copper/selenium solders according to the present invention.
Figure 2:
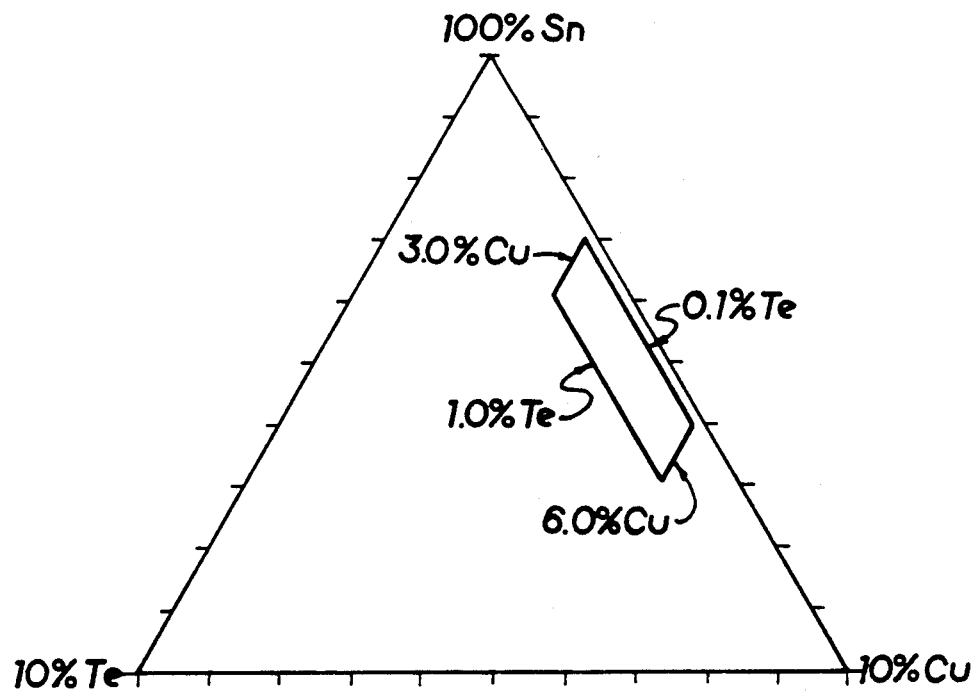
FIG. 2 shows the tin-rich portion of a ternary diagram and the locus of compositions of tin/copper/tellurium solders according to the present invention.

FIGS. 1 and 2 show the following ranges of tin, copper and selenium or tellurium in approximate percentages by weight:

TABLE I

| | |
|---|---|
| SN | 93.0–97.0 |
| CU | 3.0–6.0 |
| SE (or TE) | .10–1.0 |

The inventors have found that tellurium may be substituted for selenium in substantially the same percentages to provide substantially the same properties a the tin/copper/selenium solders. More than approximately 1.0% by weight of selenium or tellurium causes the solders to become excessively runny and exhibit excessive flowability. Inclusion of less than approximately 0.1% by weight of selenium or tellurium fails to achieve the enhanced flowability, extrusion, hardness and melting point properties which accrue from presence of selenium or tellurium in greater amounts. Inclusion of less than approximately 3.0% by weight of copper reduces the flowability of the solders unacceptably, while inclusion of more than approximately 6.0% by weight of copper causes the "pasty" or "mushy" range (a range between the solidus and liquidus points at which the solders may be worked) to be excessively broad.

The conventional manufacturing process for solders requires melting the two primary phases, tin and copper, together, and then adding the selenium. The initial efforts to produce tin/copper/selenium and tin/copper/tellurium solders according to the present invention proceeded according to that sequence. Proper proportions of tin and copper were melted together to a temperature of approximately 850° F. and selenium was then added. In a first production, the alloy mix was approximately 96% by weight tin, approximately 3% by weight copper, and approximately 1% by weight selenium. In a second production, the percentages were approximately 95%, 4.50% and 0.50% respectively. In both runs, the selenium failed to dissolve easily in the tin/copper alloy, and instead turned hard. Only approximately 50% of the selenium dissolved in the tin/copper alloy in these runs. The first production produced a very fluid solder which failed to provide excellent coverage on joints. The second production was less fluid and produced acceptable joints. The inventors noted that the required extrusion pressure was approximately 500 psi lower on the second run than for comparably sized tin/copper/silver solder, and extrusion could be conducted at a faster speed.

Interestingly, the inventors were then surprised to discover that they could melt the tin and selenium together at a lower temperature and then add the copper at a higher temperature in order to achieve desired results, contrary to conventional wisdom.

EXAMPLE I

Tin and selenium were melted together to a temperature of between 600° and 650° F. The temperature of the tin/selenium alloy was elevated to approximately 850° F. and the copper added to produce a solution consisting essentially of approximately 0.13% by weight of selenium, approximately 4.7% by weight of copper and the balance tin. The temperature was reduced to between approximately 650° and 700° F. for casting of the solder. Tables II-VII compare physical properties of that solder with a tin/copper/silver solder. These table show the excellent tensile strength, shear strength, and hardness properties of solders according to the present invention. Furthermore, the solidus point is approximately 410° F. and the liquidus point is at approximately 425° F., which is an acceptably low melting temperature and an acceptably narrow pasty range. The solder may thus be applied easily in the field, and it sets up quickly, to the convenience of plumbers.

TABLE II

Chemical Analysis

| | SN/CU/AG Sample #1 | SN/CU/SE Sample #2 |
|---|---|---|
| copper, % | 4.04 | 4.70 |
| silver, % | 0.53 | <0.01 |
| lead, % | 0.09 | 0.15 |
| bismuth, % | <0.05 | <0.05 |
| arsenic, % | <0.05 | <0.05 |
| nickel, % | <0.01 | <0.01 |
| iron, % | <0.01 | 0.01 |
| cadmium, % | <0.005 | <0.005 |
| zinc, % | 0.007 | 0.008 |
| antimony, % | <0.05 | <0.05 |
| aluminum, % | <0.05 | <0.05 |
| selenium, % | — | 0.13 |

TABLE III

Tensile Strength

| | SN/CU/AG Sample #1 | SN/CU/SE Sample #2 |
|---|---|---|
| Diameter (in.) | .254 | .250 |
| Original Area (in.$^2$) | .0507 | 0.491 |
| 0.2% offset (lbs./psi) | 214/4,220 | 198/4,040 |
| Ultimate (lbs./psi) | 318/6,280 | 350/7,130 |
| % Elongation (1") | 22.1 | 19.3 |

TABLE IV

Shear Strength (Double Shear Technique)

| | SN/CU/AG Sample #1 | SN/CU/SE Sample #2 |
|---|---|---|
| Diameter (in.) | .250 | .250 |
| Orinigal Area (in.$^2$) | .0491 | .0491 |
| Shear (lbs.) | 591 | 586 |
| Shear Strength (psi) | 6,020 | 5,970 |

TABLE V

Hardness (500 kg. 10 mm ball Brinell)

| | SN/CU/AG Sample #1 | SN/CU/SE Sample #2 |
|---|---|---|
| Brinell$_{500}$ | 14.8 | 15.1 |

TABLE VI

Joint Tensile Strength

| | SN/CU/AG Sample #1 | SN/CU/SE Sample #2 |
|---|---|---|
| Diameter (in.) | .250 | .251 |
| Original Area (in.$^2$) | .0491 | .0495 |
| Tensile Load (lbs.) | 238 | 272 |
| Tensile Strength, (psi) | 4,840 | 5,490 |

TABLE VII

Joint Shear Strength

| | SN/CU/AG Sample #1 | SN/CU/SE Sample #2 |
|---|---|---|
| Original Area (in.$^2$) | .2357 | .2387 |
| Shear Load (lbs.) | 1,280 | 1,270 |
| Shear Stress (psi) | 5,420 | 5,310 |

EXAMPLE II

A solder was prepared according to the sequence of Example 1 in the following percentages by weight:

TABLE VIII

| SN | 95.0 |
|---|---|
| CU | 4.75 |
| SE | 0.25 |

The solder tested with excellent results. The melting temperature is lower than the tin/silver/copper alloys, and the alloy tests to be a stronger alloy than conventional alloys.

As alluded to above, melting point and pasty or mushy ranges are important to the commercial viability of unleaded solders. A low melting point means that the solder may be easily applied because the plumber need not heat the copper tubing to as high a temperature. A reasonably narrow pasty range means that the solder sets up quickly so that the joint will not be disturbed if the pipe is moved while the solder is cooling beyond the solidus point. The following table compares the solidus and liquidus transition temperatures for tin/lead, tin/antimony (95/5), tin/silver/copper and solders according to the present invention.

TABLE IX

| tin/lead | 361–421° F. |
|---|---|
| tin/antimony | 455–464° F. |
| tin/silver/copper | 440–500° F. |
| tin/copper/selenium | 410–425° F. |

Although the melting point for tin/copper/selenium or tellurium solders according to the present invention is not as low as convention 50/50 solders, it is well below the melting points of 95/5 and tin/silver/copper solders, and the narrower pasty range is excellent compensation for the slightly increased melting point. In short, plumbers have continued to prefer 50/50 solder over the 95/5 and tin/silver/copper solders in large part because of the lower melting point of the 50/50 solders and their excellent working qualities. The present solders' melting point more closely approaches the 50/50, and their pasty range allows them to set more quickly than the 50/50.

Solders according to the present invention are essentially free of lead, antimony, arsenic, cobalt, bismuth, thallium, cadmium, mercury, gallium, silver, zinc or other metals often present in solders. There may be trace amounts of such elements present, of course, but not in sufficient amounts to affect mechanical, chemical or health-related properties of the solders appreciably. Example I above lists the sample tin/copper/selenium solder as containing 0.15% by weight of lead, for example; that amount is below the current typical governmental standard of 0.20% by weight of lead, and is thus considered essentially lead free for purposes of this disclosure.

Solders of the present invention may be formed into wire, bar, rod, coil or other desired form, and used in conventional fashion, with or without fluxes, to join copper or brass tubing, piping, and other plumbing fixtures.

The foregoing disclosure has been provided for purposes of illustration and explanation of the invention. Variations in solder formulation, including presence of minor amounts of elements such as, for instance, silver, lead, bismuth, arsenic, nickel, iron, cadmium, zinc, antimony and aluminum, may be included, and other variations may be produced, without departing from the scope and spirit of the invention.

What is claimed is:

1. A composition for the soldering of materials, consisting essentially of between approximately 0.1 and 1 percent by weight of selenium, between approximately 3 and 6 percent by weight of copper, and the balance tin, the composition having a solidus point of approximately 410° F., a liquidus point of approximately 425° F. and being essentially free of any of the following: lead, antimony, arsenic, cobalt, bismuth, thallium, cadmium, mercury, gallium, silver and zinc.

2. A composition according to claim 1 consisting essentially of approximately 0.13 percent by weight of selenium, approximately 4.70 percent by weight of copper, and the balance tin.

3. A composition according to claim 1 consisting essentially of approximately 0.25 percent by weight of selenium, approximately 4.75 percent by weight of copper, and the balance tin.

4. A composition for the soldering of materials, consisting essentially of between approximately 0.1 and 1 percent by weight of tellurium, between approximately 3 and 6 percent by weight of copper, and the balance tin, the composition having a solidus point of approximately 410° F., a liquidus point of approximately 425° F. and being essentially free of any of the following: lead, antimony, arsenic, cobalt, bismuth, thallium, cadmium, mercury, gallium, silver and zinc.

5. A composition according to claim 4 consisting essentially of approximately 0.13 percent by weight of tellurium, approximately 4.70 percent by weight of copper, and the balance tin.

6. A composition according to claim 4 consisting essentially of approximately 0.25 percent by weight of tellurium, approximately 4.75 percent by weight of copper, and the balance tin.

7. A structure, comprising:
   (a) a first copper member;
   (b) a second copper member; and
   (c) a bond that adheres to and connects the first and second copper members, the bond comprising a composition that consists essentially of between approximately 0.1 and 1 percent by weight of selenium, between approximately 3 and 6 percent by weight of copper, and the balance tin, the composition having a solidus point of approximately 410° F., a liquidus point of approximately 425° F. and being essentially free of any of the following: lead, antimony, arsenic, cobalt, bismuth, thallium, cadmium, mercury, gallium, silver and zinc.

8. A structure according to claim 7 in which the composition consists essentially of approximately 0.13 percent by weight of selenium, approximately 4.70 percent by weight of copper, and the balance tin.

9. A structure according to claim 7 in which the composition consists essentially of approximately 0.25 percent by weight of selenium, approximately 4.75 percent by weight of copper, and the balance tin.

10. A structure, comprising:
    (a) a first copper member;
    (b) a second copper member; and
    (c) a bond that adheres to and connects the first and second copper members, the bond comprising a composition that consists essentially of between approximately 0.1 and 1 percent by weight of tellurium, between approximately 3 and 6 percent by weight of copper, and the balance tin.

11. A structure according to claim 10 in which the composition consists essentially of approximately 0.13 percent by weight of tellurium, approximately 4.70 percent by weight of copper, and the balance tin.

12. A structure according to claim 10 in which the composition consists essentially of approximately 0.25 percent by weight of tellurium, approximately 4.75 percent by weight of copper, and the balance tin.

* * * * *

UNITED STATES PATENT AND TRADEMARK OFFICE
CERTIFICATE OF CORRECTION

PATENT NO. : 5,102,748

DATED : April 7, 1992

INVENTOR(S) : Thomas E. Wylam, Thomas K. Leonard, and Roy O. Newman

It is certified that error appears in the above-identified patent and that said Letters Patent is hereby corrected as shown below:

Cover page, Item [63], line 1   delete "1991"
 and insert --1990--

Column 2, line 35, delete "a" and insert --as--

Column 3, line 23, delete "table" and insert --tables--

Signed and Sealed this

Twenty-fourth Day of August, 1993

*Attest:*

BRUCE LEHMAN

*Attesting Officer*   *Commissioner of Patents and Trademarks*